United States Patent
Teramachi

(10) Patent No.: US 6,896,414 B2
(45) Date of Patent: May 24, 2005

(54) BALL ROLLER

(76) Inventor: Hiroshi Teramachi, 3-12-30-301, Kamiosaki, Shinagawa-ku, Tokyo (JP)

( * ) Notice: Subject to any disclaimer, the term of this patent is extended or adjusted under 35 U.S.C. 154(b) by 0 days.

(21) Appl. No.: 10/120,636

(22) Filed: Apr. 11, 2002

(65) Prior Publication Data

US 2002/0159664 A1 Oct. 31, 2002

Related U.S. Application Data

(63) Continuation-in-part of application No. 09/490,604, filed on Jan. 25, 2000, now Pat. No. 6,398,417.

(30) Foreign Application Priority Data

May 11, 2001 (JP) .......................... 2001-180873

(51) Int. Cl.$^7$ ............................ F16C 33/32; F16C 33/36
(52) U.S. Cl. ........................................ 384/491; 384/568
(58) Field of Search .............................. 384/568, 491, 384/494, 548, 571, 56, 44; 464/139–142

(56) References Cited

U.S. PATENT DOCUMENTS

| | | | |
|---|---|---|---|
| 1,469,991 A | * 10/1923 | Armstrong | 384/564 |
| 3,351,398 A | * 11/1967 | Park et al. | 384/456 |
| 3,740,108 A | 6/1973 | Fernlund | |
| 3,827,771 A | 8/1974 | Fernlund | |
| 3,829,183 A | 8/1974 | Hingley | |
| 4,547,023 A | 10/1985 | Blatter | |
| 4,802,775 A | 2/1989 | Takata | |
| 4,929,098 A | 5/1990 | Takata et al. | |
| 5,752,775 A | 5/1998 | Tsutsui et al. | |

FOREIGN PATENT DOCUMENTS

| | | |
|---|---|---|
| DE | 2161287 | 6/1973 |
| EP | 100467 | 2/1984 |
| FR | 425081 | 6/1911 |
| FR | 545806 | 10/1922 |
| JP | 35-6253 | 6/1960 |
| JP | 35-30914 UM | 11/1960 |
| JP | 47-11861 | 6/1972 |
| JP | 47-19642 UM | 11/1972 |
| JP | 49-33634 UM | 9/1974 |
| JP | 63-14019 UM | 1/1988 |
| JP | 63-14020 UM | 1/1988 |
| JP | 63-14021 UM | 1/1988 |
| JP | 11-201162 | 7/1999 |

* cited by examiner

*Primary Examiner*—Thomas R. Hannon
(74) *Attorney, Agent, or Firm*—Brinks Hofer Gilson & Lione

(57) ABSTRACT

The ball roller according to the present invention has a unique shape so that it can be handled just as easily as a conventional ball while being endurable against high load as is a roller. The ball roller comprises a rolling portion having an arcuate surface, and two spherical end portions spherically protruding from both ends of the rolling portion. The rolling portion has a radius of curvature larger than that of each of the spherical end portions, curvature centers of the spherical end portions are located on the rotational axis of the rolling portion. In another embodiment of the present invention, a ratio between the maximum diameter d of the rolling portion and the distance W between the two apexes of the spherical end portions falls within a rage of approximately 80%±17%.

1 Claim, 4 Drawing Sheets

(A)

(B)

(C)

(D)

(E)

(F)

(A)

(B)

(A)

(B)

(C) PRIOR ART ated ball roller 1 has a rolling portion 2 having an arcuately protruding surface, and two spherical end portions 3, which protrude spherically from the right and left ends of the rolling portion 2. A curvature radius R of the rolling portion 2 is larger than curvature radii r1, r2 of the spherical end portions 3. Curvature centers O1, O2 of the spherical end portions 3 are both located on the rotational axis N of the rolling portion 2.

BALL ROLLER

RELATED APPLICATIONS

This application is a continuation-in-part of U.S. patent application Ser. No. 09/490,604 filed Jan. 25, 2000, now U.S. Pat. No. 6,398,417, which is hereby incorporated by reference.

BACKGROUND OF THE INVENTION

The present invention relates to a ball roller to be disposed for rotation between relatively movable parts that constitute a rolling bearing, a linear motion guide apparatus, a uniform motion joint or the like.

Such a rolling member of conventional type for use in rolling bearings may be a ball or a roller. The ball, being in point contact, may have a small load capacity but has self-aligning ability and is easy to use. The ball is endurable against thrust load equal to about one-tenth of radial load. On the other hand, the roller, being in line contact, is about six times as endurable as the ball. But as shown in FIG. 4(C), each track 110 has to have a flange 111 for supporting an end surface 103 of the roller 100. In other words, the roller 100 has to be supported at its roller surface 102 and the end surfaces 103 in the two directions, i.e., the radial and thrust directions. Thus, both the roller surface 102 in the radial direction and the end surfaces 103 in the thrust direction require an extremely special care for precise and clean finishing. The flange 111 has to be carefully formed precisely at a right angle with respect to the track 110 so that the flange 111 will be in perfect surface contact with the end surface 103 of the roller 100. In addition, a housing and a shaft to which inner and outer wheels are attached have to be precisely arranged and aligned. Frictional resistance would otherwise increase. Moreover, even if these elements are precisely formed and arranged, the tracks may deform due to load actually imposed thereon in use and the heat expansion thereof, causing the roller 100 to unevenly contact with the tracks 110 and the flanges 111 at its circular ends because the roller lacks the self-aligning ability. Furthermore, the end surfaces 103 of the roller 100 are in sliding contact with the flanges and thus receive large frictional resistance under thrust load imposed thereon. However, due to the surface contact therebetween, lubrication is usually insufficient between the contacting surfaces A of the flanges 111 and the end surfaces 103 of the roller 100, making these surfaces prone to wear and causing the roller to seize if the frictional heat becomes extremely high.

BRIEF SUMMARY OF THE INVENTION

The present invention provides a ball roller that is three to four times as endurable as the ball while, unlike a conventional roller, it has no need to be supported in two directions, i.e., at the rolling surface and at the end surfaces. Moreover, owing to its unique shape, the ball roller causes low frictional resistance so that it can withstand large thrust load while it can be manufactured at low cost.

To achieve the purposes mentioned above, the present invention provides a ball roller comprising a rolling portion having an arcuate surface. At each end of the rolling portion is provided a spherical end portion having an arcuate surface, wherein curvature centers of the spherical ends portions are located on the rotational axis of the rolling portion.

The present invention is further characterized in that a ratio between the maximum diameter of the rolling portion and the distance between the apexes of the spherical ends portions falls within a range of approximately 80%±17%.

The ball roller may have a tapered rolling portion in which the section with the maximum diameter is located closer to one end than the other. The tapered rolling portion is of a shape in which the tapered surface of a cone is convexly curved with a curvature.

DETAILED DESCRIPTION OF THE INVENTION

Preferred embodiments of the present invention will be described hereunder in detail with reference to the accompanying drawings.

FIGS. 1(A) through 1(F) show ball rollers according to the present invention. The ball roller 1 has a rolling portion 2 having an arcuately protruding surface, and two spherical end portions 3, which protrude spherically from the right and left ends of the rolling portion 2. A curvature radius R of the rolling portion 2 is larger than curvature radii r1, r2 of the spherical end portions 3. Curvature centers O1, O2 of the spherical end portions 3 are both located on the rotational axis N of the rolling portion 2.

The maximum diameter of the rolling portion 2, which will be referred to as a short diameter d, is smaller than the distance between the two apexes t1 and t2 of the spherical end portions 3, which will be referred to as a long diameter W. A ratio between the short diameter d and the long diameter W falls within a range of approximately 80%±17%.

Figure 1:
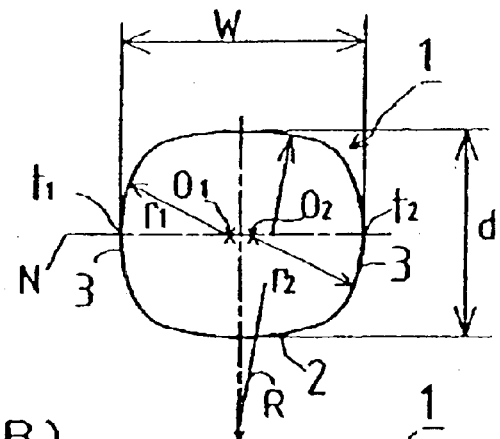
FIG. 1 show embodiments of the ball roller according to the present invention, wherein FIGS. 1(A), 1(B) and 1(C) respectively show a front view, a plane view and a side view of the ball roller in which a ratio between the short diameter and the long diameter is 80%, and FIGS. 1(D), 1(E) and 1(F) respectively show a front view, a plane view and a side view of another embodiment of the ball roller in which a ratio between the short diameter and the long diameter is 90%.
Figure 1:
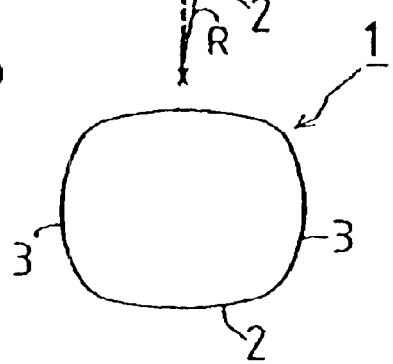
Figure 1:
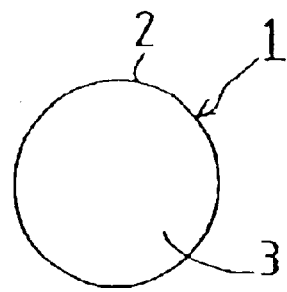
Figure 1:
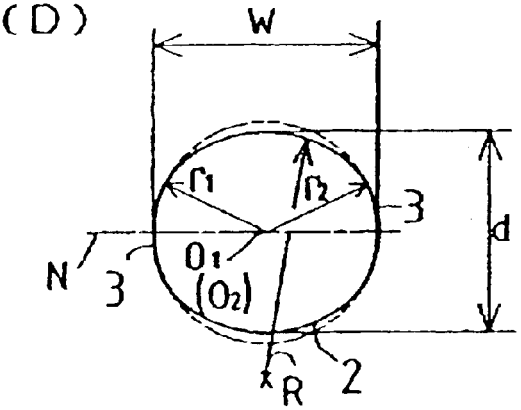
Figure 1:
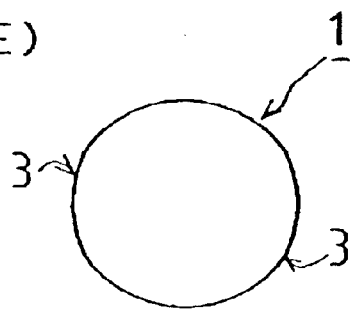
Figure 1:
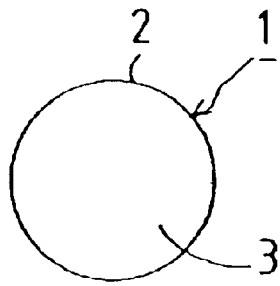

As shown in FIG. 1(A), the curvature centers O1, O2 of the left and right spherical end portions 3 may be located at different locations, or as shown in FIG. 1(D), their locations may substantially coincide with each other. The rolling portion 2 has longitudinal ends that are both curved with the same diameter and has its maximum diameter at the center along its rotational axis N.

The external shape of the ball roller 1 is formed with the arched circumferential surface of the rolling portion 2 and the spherical surfaces of the spherical end portions 3. The ball roller 1 is of a shape in its longitudinal cross-section which is intermediary between oval and spherical. The arched circumferential surface of the rolling portion 2 and the spherical surfaces of the spherical end portions 3 are continuous with rounded surfaces.

FIGS. 1(A) through 1(C) show embodiments of the present invention in which the above ratio (r/W) is 80%. FIGS. 1(D) through 1(F) show embodiments in which the above ratio is 90%. In other words, as the ratio between d and W increases, or as the difference between d and W becomes small, the appearance of the ball roller 1 becomes close to spherical while as the ratio decreases, or as the difference between d and W becomes large, the appearance becomes more a conventional roller and has higher load endurance.

Figure 2:
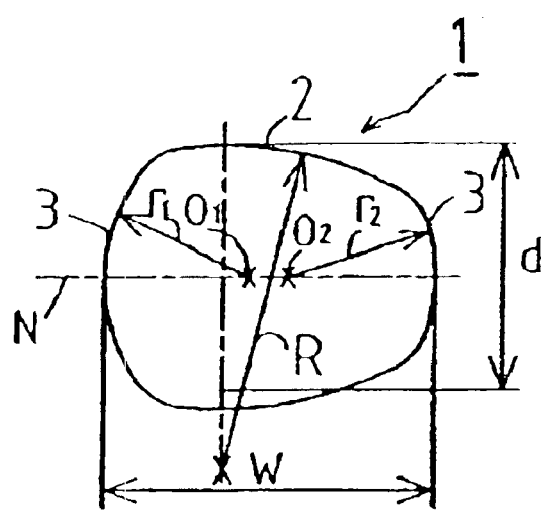
FIG. 2 show the ball roller according to the present invention in which the rolling portion is tapered, wherein FIGS. 2(A) and (B) respectively show a front view and a plane view thereof.
Figure 2:
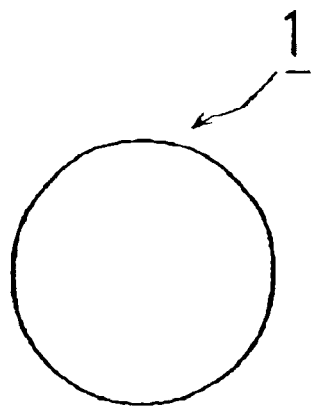

Moreover, as shown in FIGS. 2(A) and 2(B), the rolling portion 2 may be tapered, in which one longitudinal end portion has a large diameter than that of the other so as to form an arc-shaped slope in the longitudinal direction therebetween. These drawings show embodiments in which the above ratio of the short diameter d to the long diameter W is 80%.

The manufacturing processes of the ball roller 1 will be described hereinafter with reference to FIGS. (A)–(D).

Figure 3:
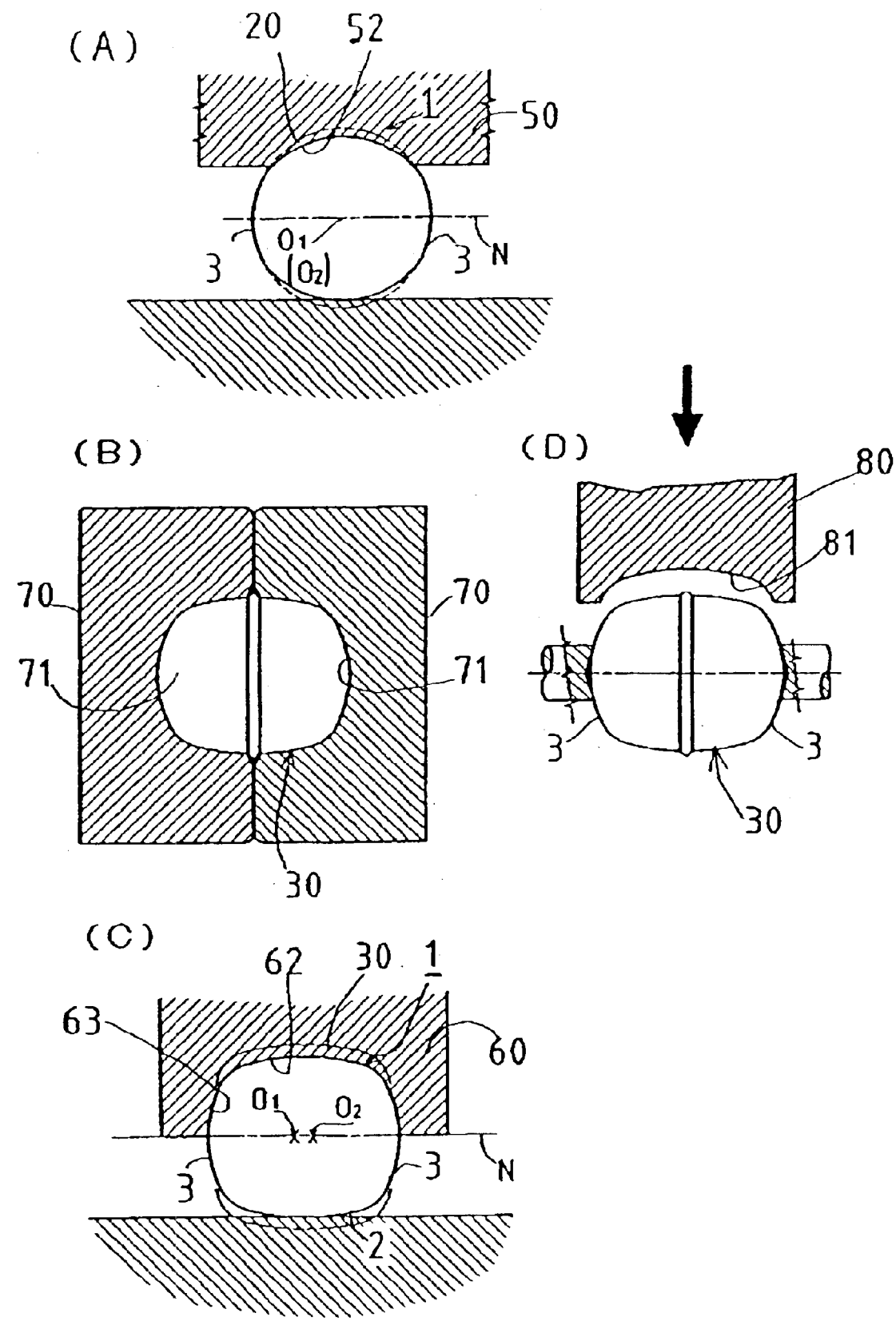
FIGS. 3(A) though (D) show manufacturing processes of the ball rollers according to the present invention.

To produce a ball roller as shown in FIG. 1(D) in which the ratio between the short diameter d and the long diameter W is large, as shown in FIG. 3(A), a steel ball 20 is ground with a concave surface 52 of a grinder 50 having the curvature corresponding to that of the rolling portion 2, and the ground surface thereof is then clean-finished. By using this method, the ball roller of the present invention can be easily produced at a low manufacturing cost. The ball roller manufactured by this method has the spherical end portions 3 consisting of the untouched spherical surfaces of the original steel ball 20.

On the other hand, to produce a ball roller as shown in FIG. 1(A) in which the ratio between the short diameter d and the long diameter W is small, a pair of molds 70 each having a curved recessed portion 71 is used to compress a raw material in the direction of axis thereof to make a nearly round material 30. This material 30 can be made from a ball material by arcuately pressing it around its center while rolling before quenching the material ball. Or, a cylindrical-shaped material can be pressed while rolling it so as to provide an arched shape. The material 30 can be ground with a grinder 60 that has a first concave surface 62 having the curved surface corresponding to the surface of the rolling portion 2 and second concave surfaces 63 at the respective ends of the first concave surface 62 each having the curved surface corresponding to the surface of the spherical end portion 3. By using this method, a ball roller 1, which has two radius centers O1, O2 of the spherical end portions 3 located on the rotational axis of the rolling portion 2, can be easily produced at a low cost.

Alternatively, the ball roller 1 can be made from the material 30, using parts of the material's original surfaces as the spherical end portions 3 by chucking the parts and grinding the material 30 with a grinder 80 having a concave surface 81 for forming the rolling portion 2.

The surfaces of the rolling portion 2 and the spherical end portions 3 do not have to be geometrically perfectly round. They may take any convexly curved shapes. Moreover, centering holes may be formed in the ball roller 1 at the apexes of the spherical end portions 3.

In such a ball roller 1, the rolling portion 2 has a contact surface which is longer than that of a conventional ball, thereby increasing its load endurance by five to six times as high as the ball.

Preferably, an effective contact length of the ball roller is about two thirds of that of a conventional roller. With this contact length, the ball roller according to the present invention is provided with load endurance four times as large as that of a conventional ball without sacrificing the self-aligning ability of the ball.

Figure 4:
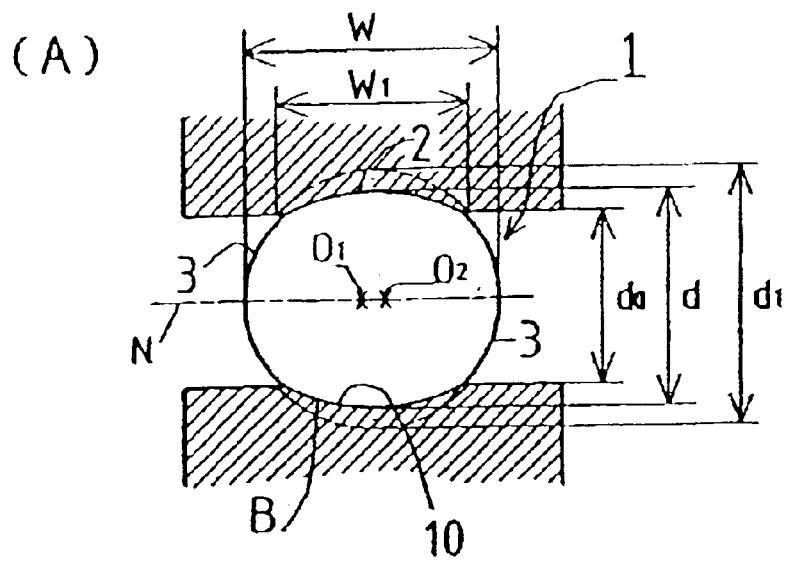
FIG. 4(A) is an explanatory view showing a state of contact between the ball roller of the present invention and its track groove.
FIG. 4(B) is an explanatory view showing a state of contact between the ball roller and its deep track groove.
FIG. 4(C) is a view showing a state of contact between a conventional roller and the track surface.
Figure 4:
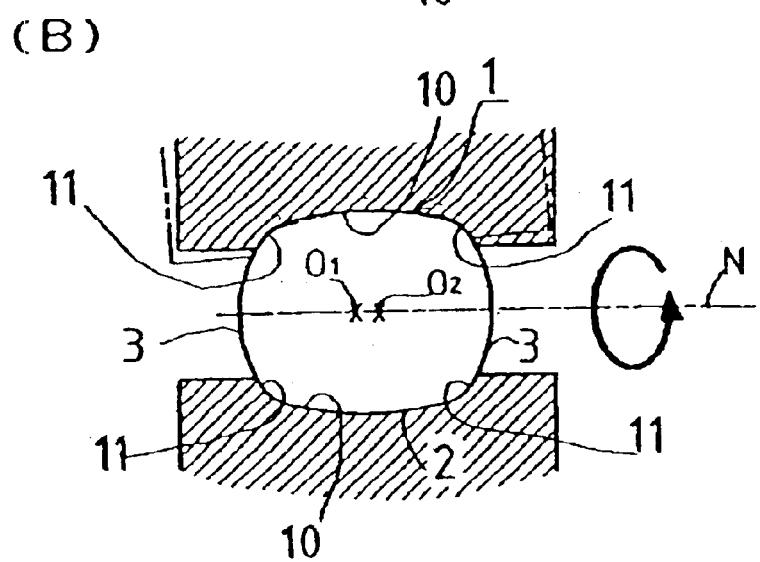
Figure 4:
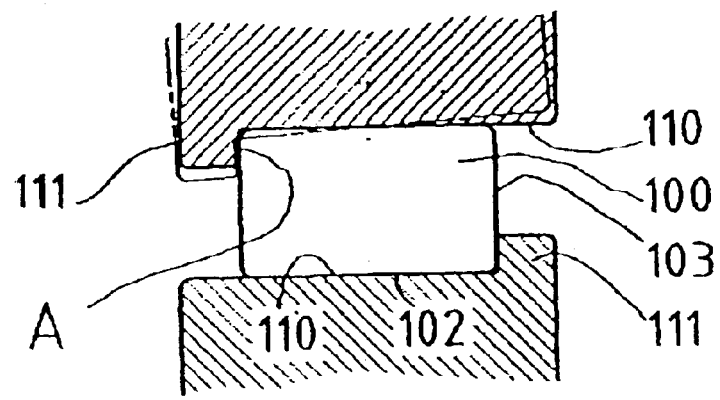

Furthermore, as shown in FIG. 4(A), if the contact length of the rolling portion 2 is referred to as W1, a differential sliding amount $\pi$ (d–d0) caused by a difference in diameters between the central portion and the end portions of the ball roller is smaller than the amount $\pi$ (d1–d0) of the ball, so that the friction resistance can be reduced, thus making the movement (rolling) smooth.

In addition, the rolling portion 2 of the ball roller 1 according to the present invention is in contact with an arched track groove 10, so that when the ball roller 1 is to carry light thrust load, it can be supported by the track groove 10 only and does not need a flange 111 that should be necessary to support a cylindrical roller 100 as shown in FIG. 4(C).

On the other hand, when the ball roller 1 is to carry large trust load, the track groove 10 can be formed deep enough for the spherical end portions 3 to partially contact therewith. Because the spherical end portions 3 and the contacting portions 11 of the track groove are in rolling and sliding contact, but mainly rolling contact, with each other, the friction resistance between them remains low while the roller 1 is capable of carrying large thrust load.

As already explained, since a conventional roller lacks the self-aligning ability, when the track surface 110 is tilted in the axial direction, as shown in FIG. 4(C), the ends of the roller 100 will be brought into uneven contact with the opposing track surfaces 110. On the other hand, since the ball roller 1 of the present invention, as shown in FIG. 4(B), is in contact with the tack groove 10 with the curved rolling portion 2, the ball roller 1 has the self-aligning ability like a ball. Further, when the track groove 10 is formed deeply enough for the spherical end portions 3 to become in partial contact therewith, the end contacting surfaces 11 and the spherical end portions 3 will be in curved surface contact. As a result, it can adjust itself against a tilt of the track. Thus, like a ball, the dimensional precision is not a strict requirement for processing and assembling various track members, such as inner and outer wheels, thereby making the ball roller 1 of the present invention easy to use.

By making the curvature radius of the track groove 10 slightly larger than that of the rolling portion 2 of the ball roller 1, they will be in surface contact with each other, and a lubricant, such as oil, will be able to spread over the track groove 10, whereby an oil film therebetween will not be broken, thus maintaining good lubrication and generating less frictional resistance. Even when the track groove 10 is formed deeply enough for the spherical end portions to partially contact with the groove, a lubricant can spread into the gap between the end contacting portions 11 and their opposing spherical end portions 3, thereby reducing frictional resistance generated therebetween. Also, the curvature radius of the end contacting portions 11 is slightly larger than that of the spherical end portions 3.

As described above, the ball roller according to the present invention has a long contact surface along its rolling portion and has load endurance several times greater than that of a conventional ball. Thus, it achieves high load carrying capacity and rigidity.

Further, the ball roller has the rolling portion in which the difference between the diameters at the central portion and the longitudinal end portions thereof is small, so that the amount of differential sliding is small and thus so is the amount of frictional resistance therebetween. Therefore, the ball roller moves smoothly and generates less heat.

Moreover, unlike a roller, the rolling portion of the ball roller according to the present invention has an arcuate surface that functions to maintain the position of the ball roller in the direction of its axis, thereby eliminating the need of a flange for restricting movement in the axial direction. If thrust load applied thereon is light, it is possible for the rolling portion to accommodate the thrust load by itself in both right and left directions. If large thrust load is to be applied, the track groove provided in the inner and outer track wheels may be formed deeply enough for the spherical end portions to partially contact therewith. Unlike a conventional roller in which its flat ends make sliding contact, the spherical end portions of the present invention make rolling-sliding contact, so that both end portions generate less frictional resistance and thus less heat.

Comparing to a ball having the same diameter as the long diameter of the ball roller, i.e., the distance between two apexes of the spherical end portions, the short diameter of the ball roller, i.e., the diameter of the rolling portion, is smaller than the ball's diameter. Therefore, the more number of ball rollers can be mounted, thereby improving the maximum load capacity thereof.

Further, when the track wheel has a track groove with a radius curvature slightly larger than that of the rolling portion of the ball roller, a lubricant will easily spread into the track groove, and the surface contact that occurs therebetween will make the oil film spread therebetween less likely to break. Therefore, good lubrication will be achieved and maintained, and frictional wear of the surfaces will be prevented. Furthermore, the contacting surfaces generate less heat, so that there will be no concern about seizing of the two moving parts that could be caused by high heat. When the track groove is formed deeply enough for the spherical end portions to partially contact therewith, the track groove and the spherical end portions will be in surface contact with each other. Therefore, a lubricant can spread into the gap between the contacting surfaces, thereby preventing frictional wear thereof and preventing the contacting surfaces from getting seized together.

Moreover, since the ball roller according to the present invention has a rolling portion of an arcuate shape, it has the self-aligning ability like a ball bearing. Furthermore, even in the embodiment where the spherical end portions are partially in contact with a deep track groove, the spherical end portions have the self-aligning ability because of the spherical surface contact therebetween, thus accommodating any inclination of the track groove. Therefore, dimensional precision is not a strict requirement for processing and assembling associating parts, such as track wheels, housing and shaft, just like a ball.

As described above, the ball roller according to the present invention has load endurance intermediary between the conventional ball bearing and the roller. The ball roller also has the self-aligning ability and can be manufactured at a low cost. This ball roller has many applications. For instance, the ball roller may be used in a shaft receiver, a linear motion guide apparatus, a uniform motion joint or the like.

What is claimed is:

1. A ball roller comprising:
    a rolling portion having an arcuate surface; and
    a spherical end portion having an arcuate surface, said spherical end portion being provided at each end of said rolling portion,
    wherein a ratio between a maximum diameter of said rolling portion and a distance between two apexes of said spherical end portions falls within a rage of approximately 80%±17%.

* * * * *